United States Patent

[11] 3,612,943

[72] Inventors Klaus Lehmann
Nieder-Ramstadt;
Rainer Bauer, Darmstadt, both of Germany

[21] Appl. No. 858,037
[22] Filed Sept. 15, 1969
[45] Patented Oct. 12, 1971
[73] Assignee Fernseh GmbH
Darmstadt, Germany
[32] Priority Oct. 4, 1968
[33] Germany
[31] P 18 01 247.0

[54] TELEVISION CAMERA TUBE WITH BUILT-IN AMPLIFIER
4 Claims, 3 Drawing Figs.

[52] U.S. Cl. ........................................................ 315/3,
313/3, 313/65 A, 17.8/7.2
[51] Int. Cl. ........................................................ H04n 5/26,
H01j 31/08, H01j 23/16
[50] Field of Search ........................................... 15/3;
313/65 A, 65 AB, 2, 65

[56] References Cited

UNITED STATES PATENTS

| | | | |
|---|---|---|---|
| 3,339,018 | 8/1967 | Brown | 178/7.2 |
| 3,459,985 | 8/1969 | Ake et al. | 313/65 A X |
| 3,522,468 | 8/1970 | Heflin et al. | 315/3 |
| 3,015,749 | 1/1962 | Francken | 315/3 |
| 3,065,368 | 11/1962 | Atti | 313/71 |

*Primary Examiner*—Robert Segal
*Attorney*—Littlepage, Quaintance, Wray & Aisenberg

ABSTRACT: A television camera tube including semiconductor preamplifier means located adjacent to the target area and directly connected to the signal electrode around the target area. The usual ringlike contact is avoided, thereby reducing the input capacitance of the preamplifier and improving the signal-to-noise ratio.

Inventors
Klaus Lehmann
Rainer Bauer
by Littlepage, Quaintance
Wray & Aisenberg
Attorneys Inventors:
Klaus Lehmann
Rainer Bauer
by Littlepage, Quaintance, Wray & Aisenberg
Attorneys

TELEVISION CAMERA TUBE WITH BUILT-IN AMPLIFIER

This invention concerns a television camera tube of the type in which a video signal is obtained from a signal electrode which is either in close proximity to or directly connected to a storage electrode. Such tubes are, for example, Vidicon tubes, SEC tubes, Plumbicon tubes, and Sicon tubes. The signal-to-noise ratio in television camera tubes of this type is determined primarily by the input capacitance of the preamplifier which first receives the video signal. This capacitance depends first upon the unavoidable capacitance of the signal electrode with respect to the adjacent electrodes of the tube, further upon the capacitance of the supply line between the amplifier input and the supply electrode, and finally upon the capacitance of the signal electrode contact. This contact generally consists of a ringlike fused portion which, in the case of Vidicon and Plumbicon tubes, is in communication with the entire circumference of the signal electrode, and which causes a considerable addition to the capacitance.

Previously arrangements have been made to hold the input capacitance as small as possible by appropriate design of the supply line in the preamplifier. For this purpose the preamplifier was previously constructed as a printed circuit on a ringlike circuit board, and this board was installed concentrically around the camera tube in the direct neighborhood of the ringlike contact of the signal electrode.

It is a purpose of this invention to further reduce the input capacitance of the preamplifier. According to the invention, the amplifier is arranged in such a manner that its input is connected directly to the signal electrode without the use of a ringlike contact. Preferably the surface of the signal electrode is constructed just slightly larger than the surface needed for the projection of the picture. It is further advantageous to place the negative feedback voltage, provided to reduce the dynamic input resistance, directly onto the signal electrode, and to connect the negative feedback resistor, provided for this purpose, directly to the signal electrode.

The invention is now further explained with the aid of the drawings which represent two examples of construction of the present invention.

Figure 1:
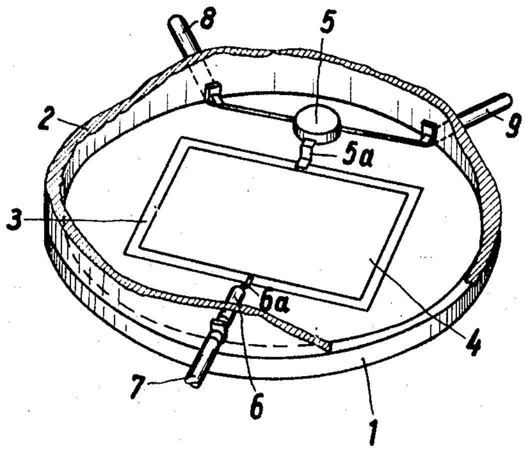
FIG. 1 is a perspective view or a portion of a television camera tube which includes the front plate and the target of the tube, in which circuit elements are provided within the tube.

The portion of a television camera tube shown in FIG. 1 can be, for instance, a component part of a Vidicon or a Plumbicon tube. Through the front plate 1 of the tube, the optical picture is projected onto the storage electrode. A small portion 2 is shown of the tube's cylindrical envelope, which is fused with the front plate 1. The storage electrode installed on this front plate is, in contrast to the usual Vidicon or Plumbicon tube, limited to one surface which coincides substantially with the surface of the screen which is contacted by the cathode ray. The storage electrode consists, as is customary, of a Nesa-layer which is applied to the front plate and which is used as a light permeable signal electrode, and of a photosemiconductor 4. The Nesa-layer projects somewhat on the edges and is provided at these edges with a metallic coating for the purpose of providing a good contact. The frame 3 formed by this metallic coating is used to derive the signal. In order to reduce to a minimum the capacitance of the region between the signal electrode and the amplifier, the control electrode of a field-effect transistor, serving as the first stage of the amplifier, is electrically connected (for example, by means of a contact spring *5a*) directly to the metal frame 3. Preferably the point of this connection is near the center of the long edge of the storage electrode. A high resistance 6 is connected on the opposite side by a spring contact *6a* touching the frame.

The resistance 6 is connected on its other side to a contact pin 7, which can be fused into the wall of the tube. The supply lines to the drain and source electrodes of the field-effect transistor 5 are respectively connected with corresponding contact pins 8 and 9. In place of the fused contact pins it is, of course, also possible to use metallic strips, for instance burned-in platinum, which extend through the fusion point between the front plate and the cylindrical envelope of the tube, with which the high resistance and the field-effect transistor are respectively soldered and thus firmly attached.

A television camera tube, constructed in the above-described manner, is able to operate under working conditions in which a tube made in the customary manner would break down.

Figure 2:
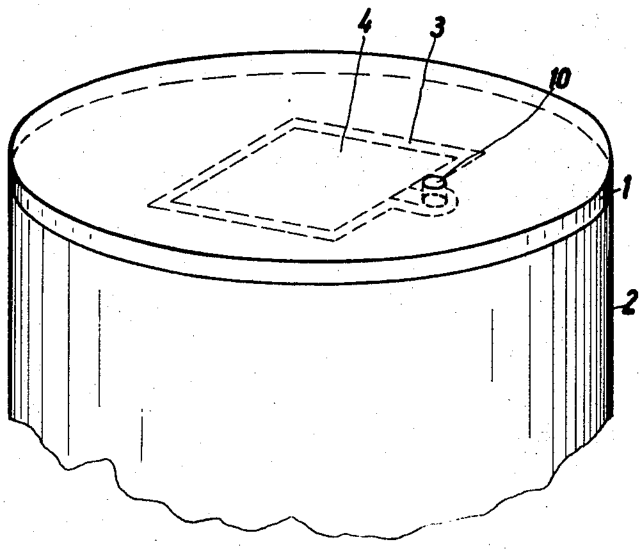
FIG. 2 is a perspective view of a different form of construction of a television camera tube in which the circuit elements are located outside the tube.
Figure 3:
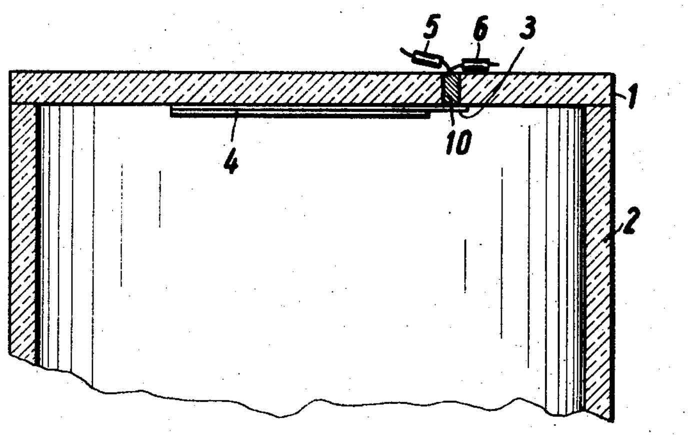
FIG. 3 is a cross-sectional view of a television camera tube according to FIG. 2.

Another type of construction of a tube with low-capacitance signal electrode is shown in perspective in FIG. 2 and in cross section in FIG. 3. In this type of construction, a signal electrode is obtained with very low capacitance and the shortest line of connection to the amplifier. The storage electrode (as in the previous example) is, for all practical purposes, not substantially larger than the surface that is traced by the electrode. As described above, the signal electrode consists of a Nesa-layer which projects slightly over the storage layer and a metallic strip 3 which frames the storage layer. In contrast to the previous example of construction, in this example the lead to the signal electrode is inserted directly adjacent to the storage electrode in the front plate in the form of a pin 10. Such a lead-in can be constructed, for example, by drilling a hole in the front plate and inserting a piece of preglazed wire into this hole. Then the front plate is heated in a furnace up to a temperature at which the glazing of the piece of wire combines with the glass of the front plate. Then the protruding portions of the wire and the glaze are ground off on the inside and the outside. The front plate 1, which has been prepared in this manner, can now be provided with the Nesa layer, the photosemiconductor 4 and the frame 3. Masks are used to make certain that the piece of wire is not covered by the material of the Nesa layer, but rather with the metal of the frame 3, thereby producing a good contact with this frame.

After the entire image-making system has been installed, the camera tube is provided with an amplifier which is attached (for example, by glueing) to the front plate next to or above the wire pin 10. The control electrode of a field-effect transistor can be connected to pin 10 to operate as an impedance transducer, as well as a high resistance for the supply of the bias voltage and the negative feedback voltage of the transistor. These units have been numbered as 5 and 6 in FIG. 3. In place of this transistor system, it is also possible to use an integrated amplifier control, for example, a monolithic amplifier which is then glued onto the front plate.

Further improvements and additions to the present invention lie entirely within the field of knowledge and ability of anyone skilled in this art. For example, it is possible to provide at the edge of the front plate still further contacts for the connection of operating voltage for the amplifier and for the reception of the television signal. In those cases in which it is desired to have an extreme sensitivity without consideration of picture distortion or other disruptions of the signals, it is possible to reduce the capacitance of the signal electrode by eliminating the field network, which would otherwise be used in order to homogenize the field in front of the target.

We claim:

1. A television camera apparatus comprising an evacuated envelope having a front plate,
   - a signal electrode located directly on said front plate, a photoconductive layer substantially covering said signal electrode, a portion of said signal electrode being exposed, a pin penetrating said front plate and having one end connected to said exposed portion, a semiconductor amplifier means permanently bonded to the outside surface of said front plate and having its input directly connected to the other end of said pin.

2. A tube according to claim 1 wherein said amplifier means further comprises a monolithic amplifier permanently stuck to the outside of said front plate.

3. A television camera apparatus comprising an evacuated envelope having a front plate, a signal electrode located directly on the front plate, a photoconductive layer substantially covering said signal electrode, a peripheral portion of said signal electrode being exposed, a semiconductor amplifier permanently mounted on the inside surface of said front plate adjacent said electrode and having its input connected to the exposed peripheral portion thereof, said amplifier further having terminals connected to contacts extending through the wall of said envelope, and a resistor in series with said electrode and a further contact extending through said envelope wall.

4. A tube according to claim 3 wherein said resistance and said terminal are connected to diametrically opposite portions of said signal electrode.